(12) United States Patent
Thurston

(10) Patent No.: US 7,124,064 B1
(45) Date of Patent: Oct. 17, 2006

(54) AUTOMATIC GENERATION OF HARDWARE DESCRIPTION LANGUAGE CODE FOR COMPLEX POLYNOMIAL FUNCTIONS

(75) Inventor: Andrew J. Thurston, Allen, TX (US)

(73) Assignee: Cisco Technology, Inc., San Jose, CA (US)

(*) Notice: Subject to any disclaimer, the term of this patent is extended or adjusted under 35 U.S.C. 154(b) by 919 days.

(21) Appl. No.: 09/822,713

(22) Filed: Mar. 30, 2001

(51) Int. Cl.
*G06F 17/10* (2006.01)
*H04B 3/40* (2006.01)

(52) U.S. Cl. .................................. 703/2; 370/283.1
(58) Field of Classification Search ............... 703/2; 370/283.1
See application file for complete search history.

(56) References Cited

U.S. PATENT DOCUMENTS

| | | | |
|---|---|---|---|
| 4,597,083 A | 6/1986 | Stenerson | 371/37 |
| 4,873,688 A | 10/1989 | Maki et al. | 371/37.1 |
| 5,051,999 A | 9/1991 | Erhart et al. | 371/41 |
| 5,363,379 A | 11/1994 | Eckenrode et al. | 371/3 |
| 5,574,717 A * | 11/1996 | Tomizawa et al. | 370/244 |
| 5,583,499 A | 12/1996 | Oh et al. | 341/94 |
| 5,642,367 A * | 6/1997 | Kao | 714/784 |
| 5,673,279 A * | 9/1997 | Oskouy et al. | 714/819 |
| 5,710,782 A | 1/1998 | Weng | 714/785 |
| 5,818,855 A * | 10/1998 | Foxcroft | 714/759 |
| 5,844,918 A | 12/1998 | Kato | 714/751 |
| 5,905,664 A * | 5/1999 | Ko et al. | 708/491 |
| 5,920,711 A * | 7/1999 | Seawright et al. | 703/15 |
| 6,199,188 B1 | 3/2001 | Shen et al. | 714/782 |
| 6,286,123 B1 | 9/2001 | Kim | 714/781 |
| 6,385,751 B1 | 5/2002 | Wolf | 714/784 |
| 6,571,368 B1 | 5/2003 | Chen | 714/784 |
| 6,683,855 B1 | 1/2004 | Bordogna et al. | 370/244 |
| 6,684,350 B1 | 1/2004 | Theodoras, II et al. | 714/712 |
| 6,684,364 B1 | 1/2004 | Cameron | 714/785 |
| 6,751,743 B1 | 6/2004 | Theodoras, II et al. | 713/400 |
| 2002/0165962 A1 | 11/2002 | Alvarez et al. | 709/226 |

OTHER PUBLICATIONS

Witold Litwin, Thomas Schwarz, LH*rs: A High-Availability Scalable Distributed Data Structure using Reed Solomon Codes, ACM 2000, pp. 237-248.*
Anna Hac, Xiaoyang Chu, "A New Cell Loss Recovery Method Using Forward Error Correction in ATM Networks" 1998 International Journal Of Network Mangement, pp. 87-103.*
Shu Lin and Daniel J. Costello, Jr., "Error Control Coding *Fundamentals and Applications*," Prentice-Hall, Inc. Englewood Cliffs, New Jersey, Chapter 6, pp. 141-183.
Christian Schuler, "Code Generation Tools For Hardware Implementation Of FEC Circuits", 6th International Conference on Electronics, Circuits and Systems ICECs 99, Paphos, Cyprus, Greece, Sep. 5-8, 1999.

* cited by examiner

*Primary Examiner*—Paul L. Rodriguez
*Assistant Examiner*—Dwin M. Craig
(74) *Attorney, Agent, or Firm*—Campbell Stephenson Ascolese LLP

(57) ABSTRACT

An apparatus and method of implementing a circuit representing a complex polynomial equation in a hardware description language (HDL) for implementing an ASIC (Application Specific Integrated Circuit) is provided. A serial circuit representing the complex polynomial equation is implemented in a software program. The serial circuit implementation is simulated to produce a plurality of parallel equations that are mapped into HDL with ASCII strings. In one embodiment, the complex polynomial equation is a Bose-Chaudhuri-Hocquenghem (BCH) code utilized in forward error correction circuitry.

44 Claims, 10 Drawing Sheets

AUTOMATIC GENERATION OF HARDWARE DESCRIPTION LANGUAGE CODE FOR COMPLEX POLYNOMIAL FUNCTIONS

CROSS REFERENCE TO RELATED APPLICATIONS

The present invention is related to subject matter disclosed in the following co-pending applications, which are all hereby incorporated by reference herein in their entireties:

1. United States patent application entitled, "Error Insertion Circuit for SONET Forward Error Correction", Ser. No. 09/821,948, naming Andrew J. Thurston and Douglas Duschatko as inventors and filed substantially contemporaneously with the present application;
2. United States patent application entitled, "BCH Forward Error Correction Decoder", Ser. No. 09/822,950, naming Andrew J. Thurston as inventor and filed substantially contemporaneously with the present application; and
3. United States patent application entitled, "Galois Field Multiply Accumulator", Ser. No. 09/822,733, naming Andrew J. Thurston as inventor and filed substantially contemporaneously with the present application.

BACKGROUND OF THE INVENTION

1. Field of the Invention

The present invention relates to the field of application specific integrated circuit design and more particularly the design of complex circuitry utilizing automatic generation of hardware description language code.

2. Description of the Related Art

A data communications network is the interconnection of two or more communicating entities (i.e., data sources and/or sinks) over one or more data links. A data communications network allows communication between multiple communicating entities over one or more data communications links. The use of lightwave communications carried over fiber optic cables is a popular method of providing high bandwidth communications.

The synchronous optical network (SONET) protocol is among several protocols designed to employ an optical infrastructure. A similar standard to SONET is the Synchronous Digital Hierarchy (SDH) which is the optical fiber standard predominantly used in Europe. There are only minor differences between the two standards. Accordingly, hereinafter any reference to the term SONET refers to both SDH and SONET networks, unless otherwise noted.

SONET utilizes a byte-interleaved multiplexing scheme. Multiplexing enables one physical medium to carry multiple signals. The first step in the SONET multiplexing process involves the generation of the lowest level or base signal. In SONET, this base signal is referred to as synchronous transport signal-level 1, or simply STS-1, which operates at 51.84 Mbps (Megabits per second). Data between adjacent nodes is transmitted in these STS modules. Each STS is transmitted on a link at regular time intervals (for example, 125 microseconds) and grouped into frames. See Bellcore Generic Requirements document GR-253-CORE (Issue 2, December 1995), hereinafter referred to as "SONET Specification." Higher-level signals are integer multiples of STS-1. An STS-N signal is composed of N byte-interleaved STS-1 signals.

FIG. 1 illustrates the frame format of the STS-1 signal. SONET organizes STS data streams into frames, consisting of transport overhead and a synchronous payload envelope (SPE). The overhead consists of information that allows the network to operate and allow communications between a network controller and nodes. The transport overhead includes framing information, pointers, performance monitoring, communications, and maintenance information. The synchronous payload envelope is the data to be transported throughout the network, from node to node until the data reaches its destination. The SPE is 87 columns wide by 9 rows deep, a total of 783 bytes.

The transport overhead is composed of section overhead and line overhead. Section overhead is accessed, generated and processed by section terminating equipment (STE). Section overhead supports functions such as performance monitoring, local orderwire, and framing. Line overhead is accessed, generated and processed by line terminating equipment (LTE). Line overhead supports functions such as locating the SPE in the frame, multiplexing or concatenating signals, performance monitoring, automatic protection switching, and line maintenance.

Forward error correction (FEC) is incorporated into the SONET frame to decrease bit error rate (BER) on the SONET signal. FEC adds additional information to the data stream to detect and correct any errors that are caused by the transmission system. The additional information is added to each message in a systematic way so that the resultant codewords have a one to one relation to the messages. FEC identifies a block or packet of data that represents the message. The message block size is typically a power of two bits or bytes. Codewords include the message block and the additional information. For every valid codeword there is one and only one message. For example, for an 8-bit message, one bit of additional information is added in the form of an even parity bit. The message (1 0 1 0 1 0 0 0) becomes the codeword (1 0 1 0 1 0 0 0 1). Therefore, the codeword (0 1 1 0 1 0 0 0 0) is not a valid codeword even though it is 9 bits long just like the other codeword. In this example, the resultant codeword supports $2^9$ possible bit patterns, but only $2^8$ of those patterns are valid.

Algorithms used for FEC include convolutional codes, Hamming codes, Reed-Solomon codes, and BCH (Bose-Chaudhuri-Hocquenghem) codes. BCH codes form a large class of powerful random error-correcting cyclic codes, and have the advantage of being robust and very efficient in terms of the relatively low number of check bits required. These check bits are also easily accommodated in the unused SONET overhead byte locations. BCH codes are specified with three primary parameters, n, k, and t, where:

n=block length (the length of the message bits plus the additional check bits)
k=message length (the number of data bits included in a check block)
t=correctable errors (the number of errors per block which the code can correct).

BCH codes have the property that the block length n is equal to $2^m-1$, where m is a positive integer. The code parameters are denoted as (n,k). Another parameter often referred to is the "minimum distance" $d_{min} \geq 2t+1$. The minimum distance defines the minimum number of bit positions by which any two code words can differ. The ITU committee responsible for error correction in SONET networks (committee T1X1.5) has developed a standard for FEC in SONET OC-192 systems which implements a triple-error correcting BCH code referred to as BCH-3.

Galois field or finite field mathematics is the mathematical foundation for BCH-based forward error correction. A Galois field is a type of field extension obtained from considering the coefficients and roots of a given polynomial (also known as the root field). The generator polynomial for a t-error correcting BCH code is specified in terms of its roots from the Galois field GF($2^m$). If $\alpha$ represents the primitive element in GF($2^m$), then the generator polynomial g(X) for a t-error correcting BCH code of length $2^m-1$ is the lowest-degree polynomial which has $\alpha, \alpha^2, \alpha^3, \ldots, \alpha^{2t}$ as its roots, i.e., g($\alpha^i$)=0 for $1 \leq i \leq 2t$. It can be shown from the foregoing that g(X) must be the least common multiple (LCM) of $\phi_1(X), \phi_3(X), \ldots, \phi_{2t-1}(X)$, where $\phi_i(X)$ is the minimal polynomial of $\alpha^i$.

Decoding of BCH codes likewise requires computations using Galois field arithmetic. Galois field arithmetic can be implemented (in either hardware or software) more easily than ordinary arithmetic because there are no carry operations. The first step in decoding a t-error correction BCH code is to compute the 2t syndrome components $S_1, S_1, \ldots, S_{2t}$. For a hardware implementation, these syndrome components may be computed with feedback registers that act as a multiply accumulator (MAC). Since the generator polynomial is a product of, at most, t minimal polynomials, it follows that, at most, t feedback shift registers (each consisting of at most m stages) are needed to form the 2t syndrome components, and it takes n clock cycles to complete those computations. It is also necessary to find the error-location polynomial that involves roughly $2t^2$ additions and $2t^2$ multiplications. Finally, it is necessary to correct the error(s) which, in the worst case (for a hardware implementation), requires t multipliers shifted n times. Accordingly, circuits that implement BCH codes are typically either quite complex, or require many operations. For example, the BCH-3 iterative algorithm requires up to five separate steps, with each step involving a varying number of computations, and any hardware implementation of BCH-3 must support the maximum possible number of steps/computations. Implementation of the calculations in electronic circuits can be accomplished with serial based hardware. However, performing calculations serially can take multiple clock cycles for operations to complete. Usage of serial techniques to perform many Galois field operations, including multiplication and division, may not meet system performance goals and may require the use of parallel techniques. The design and implementation of parallel circuitry to perform the calculations is often tedious and error prone.

SUMMARY OF THE INVENTION

In accordance with the present invention, an apparatus and method of implementing a circuit representing a complex polynomial equation in a hardware description language (HDL) for implementing an ASIC (Application Specific Integrated Circuit) is provided. A serial circuit representing the complex polynomial equation is implemented in a software program. The serial circuit implementation is simulated to produce a plurality of parallel equations that are mapped into HDL with ASCII strings. In one embodiment, the complex polynomial equation is a Bose-Chaudhuri-Hocquenghem (BCH) code utilized in forward error correction circuitry.

The foregoing is a summary and thus contains, by necessity, simplifications, generalizations and omissions of detail; consequently, those skilled in the art will appreciate that the summary is illustrative only and is not intended to be in any way limiting. As will also be apparent to one of skill in the art, the operations disclosed herein may be implemented in a number of ways, and such changes and modifications may be made without departing from this invention and its broader aspects. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features and advantages made apparent to those skilled in the art by referencing the accompanying drawings.

The use of the same reference symbols in different drawings indicates similar or identical items.

DETAILED DESCRIPTION

The following is intended to provide a detailed description of an example of the invention and should not be taken to be limiting of the invention itself. Rather, any number of variations may fall within the scope of the invention that is defined in the claims following the description.

Introduction

According to an embodiment of the present invention, a new method of implementing Galois Field multiply operations in an ASIC (Application Specific Integrated Circuit) is provided. A software program is used to create parallel equations representing complex polynomial operations utilizing ASCII strings which can be used in a hardware description language implementation of a circuit. In particular, a serial circuit representing a complex polynomial equation is implemented in a software program. The serial circuit is implemented such that a simulation of the circuit produces one or more parallel equations that are ASCII string outputs. The parallel equations can be used in a hardware description language implementation of the complex polynomial equation.

Example Networking Environment

Figure 1:
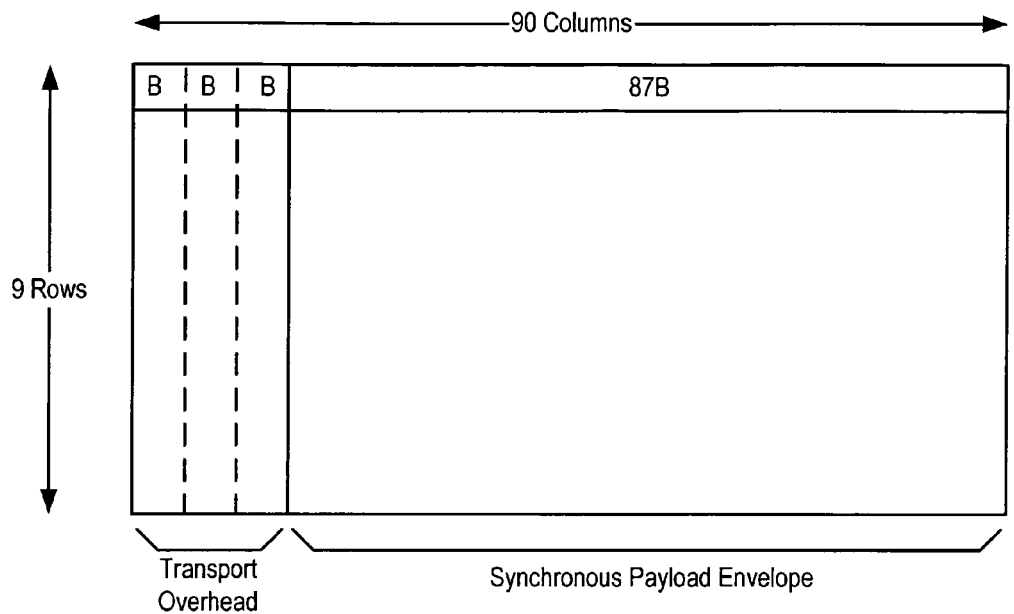
FIG. 1 illustrates an exemplary frame format of a SONET frame.
Figure 2:
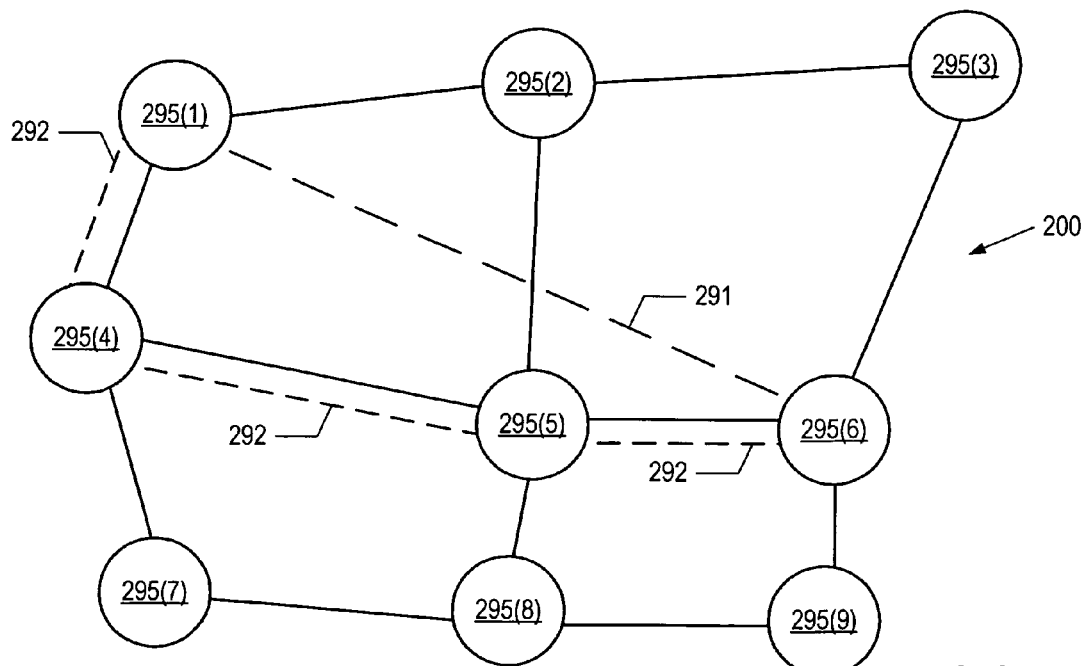
FIG. 2 illustrates a network environment in which embodiments of the present invention may be practiced.

FIG. 2 illustrates a network environment in which embodiments of the present invention may be practiced. Network 200 includes a number of nodes, network nodes 295 (1)–(N). One or more of network nodes 295(1)–(N) can be a router such as router 300, described in FIG. 3, or any other type of telecommunication hub such as a repeater. Network 200 can support the automatic provisioning, testing, restoration, and termination of virtual paths (exemplified by a virtual path 291) over a physical path (exemplified by a physical path 292) from one of network nodes 295(1)–(N) to another of network nodes 295(1)–(N). Physical path 292 utilizes fiber-optic cables, for example, in order to offer high speed and a relatively large number of connections provided by an optical arrangement.

Figure 3:
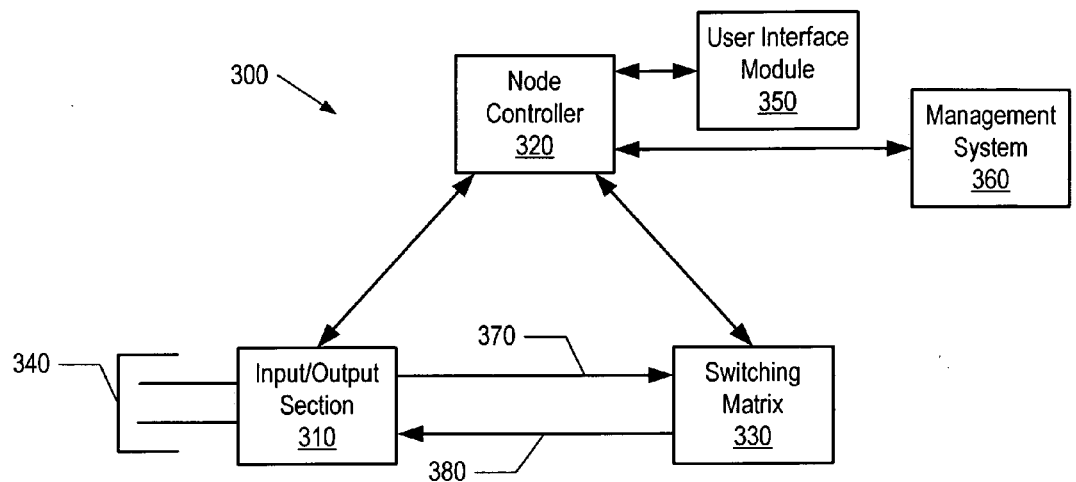
FIG. 3 illustrates a block diagram of an exemplary router.

FIG. 3 illustrates a block diagram of an exemplary router 300. Router 300 is a high-capacity telecommunication network device based on optical technologies and components that provides routing, grooming and restoration at wavelength levels as well as wavelength-based services. Router 300 interconnects routers and switches across an optical transport network, accepting various wavelengths on input ports and routing them to appropriate output ports in the network. Router 300 provides routing for traffic at wavelength granularities, e.g., OC-48 or OC-192, and enables functionality to be controlled by software managed centrally.

Router 300 includes an input/output section 310, a node controller 320, and a switching matrix 330. Node controller 320 contains, for example, real time software and intelligent routing protocols (not shown). Router 300 supports interfaces including, but not limited to, optical signal interfaces 340 (e.g., SONET), a user interface module 350, and a management system 360. Internal input signals 370 and internal output signals 380 may be electrical or optical in nature. Router 300 preferably provides redundancy at all levels to prevent any single point system failure. All processors, memory and communications are preferably 1:1 redundant.

Node controller 320 is responsible for managing and controlling input/output section 310, which can contain multiple line cards. Some of the functions handled by node controller 320 include the periodic collection of maintenance data from the line cards, receiving and processing periodic keep-alive messages from those cards, shelf startup and configuration, proxy management, and other related functions. Each line card is coupled to two fiber optic cables, one for each direction. The fiber optic cables support a standard OC-48 or OC-192 SONET data stream. Switching matrix 330 provides routing and switching between line cards.

Figure 4:
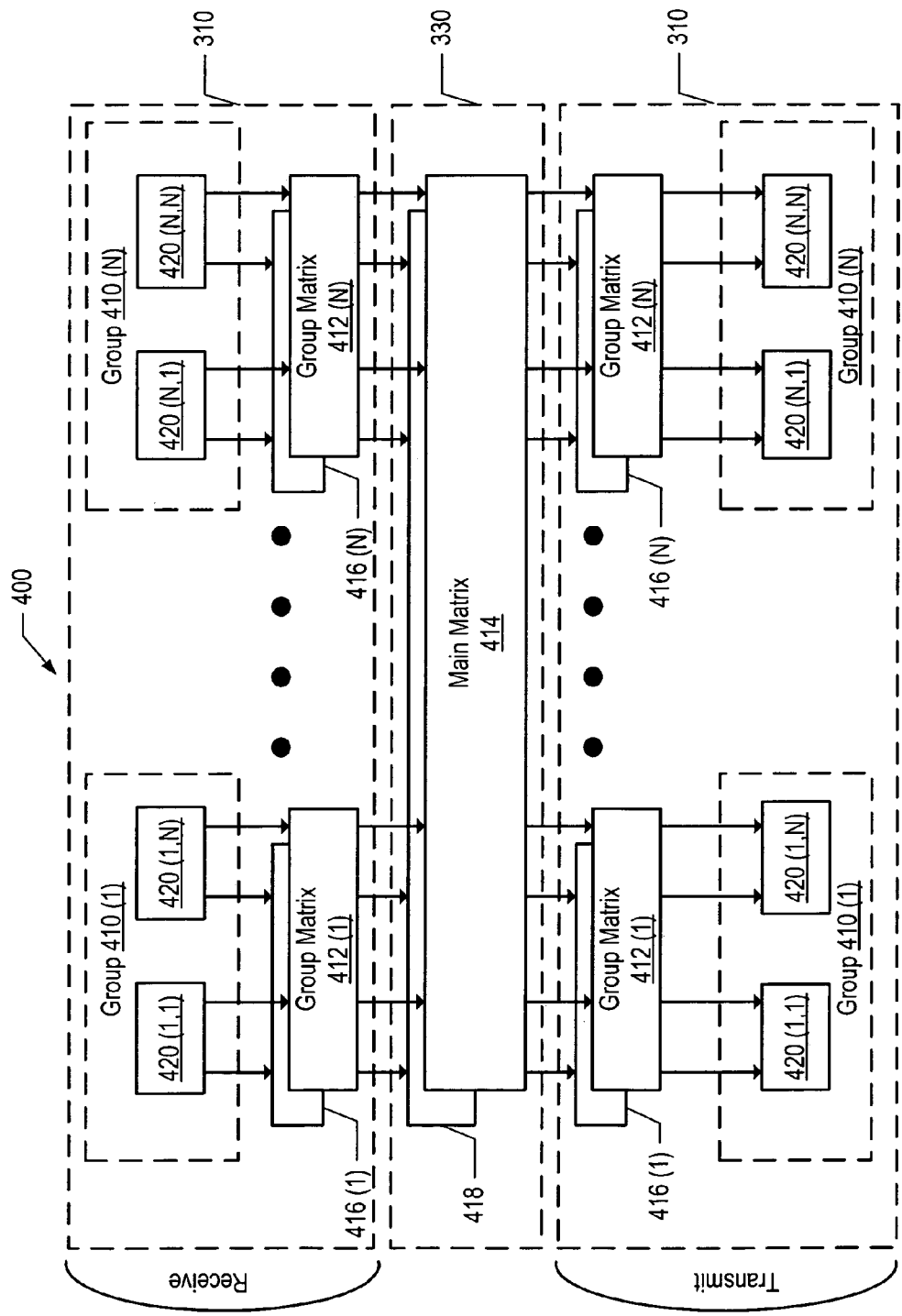
FIG. 4 illustrates a block diagram of the signal paths and functional blocks of an exemplary router.

FIG. 4 is a block diagram of signal paths 400 within router 300. The primary signal paths include one or more groups exemplified by groups 410(1)–(N), group matrices 412(1)–(N), and a main matrix 414. Groups 410(1)–(N) and group matrices 412(1)–(N) have receive and transmit sections. Groups 410(1)–(N) each include line cards 420(1,1)–(1,N), through line cards 420(N, 1)–(N, N). Signals from line cards 420(1,1)–(N,N) are sent to the corresponding group matrix. In one embodiment, two sets of the group matrix cards, depicted in FIG. 4 as group matrices 412(1)–(N) and 416(1)–(N), are employed. In one embodiment, main matrix 414 is also mirrored by a redundant copy (a backup main matrix 418). Main matrix 414 and backup main matrix 418 together form switching matrix 330. As shown in FIG. 4, redundancy for group matrices 412(1)–(N) (i.e., group matrices 416(1)–(N)) exists on the transmit side.

It will be noted that the variable identifier "N" is used in several instances in FIG. 4 and other figures (and subsequent use of other variables, such as "m," "x," "k," and others) to more simply designate the final element (e.g., group matrix 412(N), line card 420(N,N), and so on) of a series of related or similar elements (e.g., group matrices 412(1)–(N), line cards 420(1,1)–(N,N), and so on). The repeated use of such variable identifiers is not meant to imply a correlation between the sizes of such series of elements. The use of such variable identifiers does not require that each series of elements have the same number of elements as another series delimited by the same variable identifier. Rather, in each instance of use, the variable identified by "N" (or "m", "x", "k," and others) may hold the same or a different value than other instances of the same variable identifier. For example, group matrix 412(N) may be the tenth group matrix in a series of group matrices, whereas line card 420(N,N) may be the forty-eighth line card in a series of line cards.

Using signal paths 400 as an example, data enters the system at one of line cards 420(1,1)–(N,N). It is at this point, in a SONET-based system, that the Section and Line overheads are processed and stripped off by a protocol processor (not shown). The extracted SONET payload envelope is then synchronized with the system clock and sent to two different copies of a local matrix, depicted as group matrices 412(1)–(N) and 416(1)–(N). In one embodiment, group matrices 412(1)–(N) and 416(1)–(N) are used mainly as 2:1 reduction stages that select one of two optical signals and pass the selected optical signal to switching matrix 330. This allows the implementation of a variety of protection schemes (including 1:N, or 0:1) without having to use any additional ports on main matrix 414. All protect signals are terminated at group matrices 412(1)–(N) and 416(1)–(N). In order to maximize bandwidth, it is preferable that only active signals be passed through to switching matrix 330.

Line cards 420(1,1)–(N,N) receive optical signals from group matrices 412(1)–(N) and 416 (1)–(N) which are in turn connected to two separate copies of the main matrix. Line cards 420(1,1)–(N,N) monitor both signals for errors and, after a user-defined integration period, switch to the backup signal if that signal exhibits better signal quality, (e.g., lower bit error rate (BER)) than the prior active signal. The selected signal is then processed by the transmit section of the protocol processor, which inserts all required transport overhead bytes into the outgoing stream.

Regarding the signals described herein, both above and subsequently, those skilled in the art will recognize that a signal may be directly transmitted from a first logic block to a second logic block, or a signal may be modified (e.g., amplified, attenuated, delayed, latched, buffered, inverted, filtered or otherwise converted, etc.) between the logic blocks. Although the signals of the embodiments described herein are characterized as transmitted from one block to the next, other embodiments may include modified signals in place of such directly transmitted signals with the informational and/or functional aspect of the signal being transmitted between blocks. To some extent, a signal input at a second logic block may be conceptualized as a second signal derived from a first signal output from a first logic block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not substantively change the informational and/or final functional aspect of the first signal.

Figure 5:
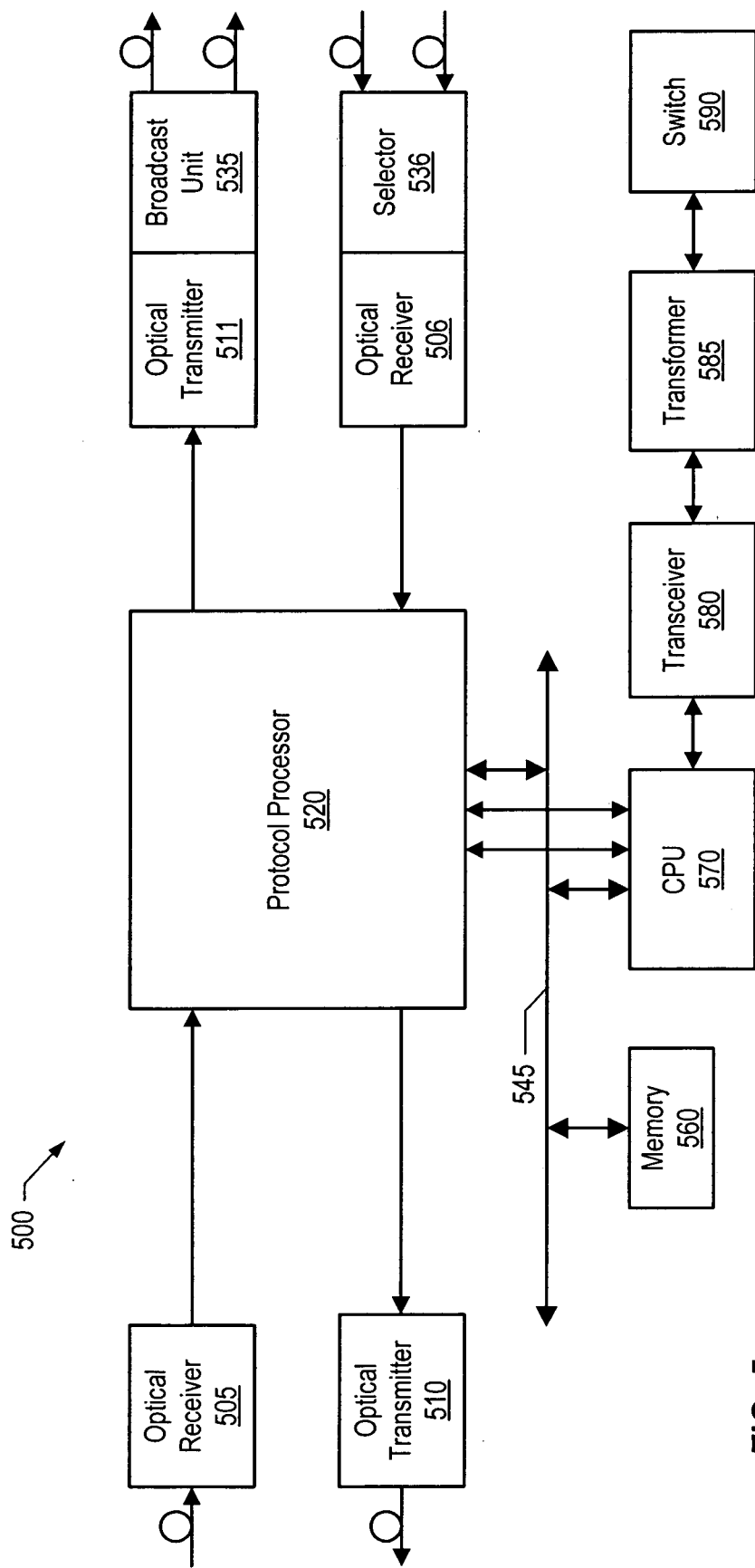
FIG. 5 illustrates the major components of an exemplary line card.

FIG. 5 illustrates the major components of one of line cards 420(1,1)–(N,N), exemplified in FIG. 5 by a line card 500. Line card 500 integrates all necessary hardware and software functions to properly terminate the physical layer. Line card 500 also provides a redundant optical connection to the switch matrix, and a communication channel to other modules in the system.

Line card 500 performs various aspects of the SONET protocol, including framing, insertion and extraction of embedded data channels, error checking, pointer processing, clock recovery, multiplexing/duplexing, and the like. Data enters the system at line card 500 via an OC-48 or OC-192 optical channel. In a SONET implementation, line card 500, for example, terminates the transport overhead (Section+ Line) of a SONET data stream, (e.g., a full duplex OC-48 or OC-192 data stream). The extracted SONET payload envelope is then synchronized with a system clock and sent to switching matrix 330. Data leaving the system is processed by the transmit section of the line card, which inserts all required transport overhead bytes into the outgoing stream.

Line card 500 receives optical signals from other network elements via a line-side optical receiver 505 and from the local router's system via a system-side optical receiver 506. Each of these receivers implements an optical-to-electrical (O/E) conversion function. Line card 500 transmits optical signals to other network elements using a line-side optical transmitter 510 and to the group matrices using a system-side optical transmitter 511. Each of these transmitters implements an electrical-to-optical (E/O) conversion function. Optical transmitter 511 can transmit, for example, an OC-48 data stream or multiples of lower bandwidth data streams (e.g., 4 OC-12 data streams or 48 OC-1 data streams). Optical receiver 506 can receive, for example, an OC-48 data stream or multiples of lower bandwidth data streams. Optical transmitter 511 and optical receiver 506 can be duplicated to handle higher bandwidth data streams. For example, four optical transmitters 511 together can transmit an OC-192 data stream and four optical receivers 506 together can receive an OC-192 data stream. It will be noted that line-side refers to the side of the line card coupled to other network elements and system-side refers to the side of the line card coupled to the group matrices.

Line-side optical receiver 505 is coupled to a protocol processor 520 that performs clock recovery multiplexing, de-multiplexing, and SONET STE/LTE (Section Terminating Equipment/Line Terminating Equipment) processing in both directions. Similarly, system-side optical receiver 506 is also coupled to protocol processor 520 to allow protocol processor 520 to receive optical signals. The processed electrical signals from protocol processor 520 are coupled to the transmitters 510 and 511. The clock recovery functions are preferably combined with de-multiplexers and multiplexers to support reception and transmission of the optical data, respectively. The multiplexers serialize output data generated in protocol processor 520 by performing parallel-to-serial conversion on the parallel data. In contrast, de-multiplexers are used in protocol processor 520 to perform serial-to-parallel conversion on received data.

In order to add protection channels, line-side optical transmitter 510 is also coupled to a 1:2 broadcast unit 535. To receive such optical signals, optical receiver 506 is also coupled to a 2:1 selector 536 in order to select the working channel before the optical signals leave the shelf and thus prevent the standby channel (also referred to herein as the protect channel) from using any bandwidth on switching matrix 330.

Protocol processor 520 is coupled to a bus 545. Protocol processor 520 interfaces the line card to two copies of the matrix in a 1+1 physical protocol. In a SONET implementation, protocol processor 520 provides both STE/LTE processing according to published industry standards. Also coupled to bus 545 are a memory 560 and a CPU 570. Memory 560 should be fast enough for efficient operation of CPU 570.

CPU 570 communicates with other line cards 420(1,1)–(N,N) over a control bus (not shown) using a transceiver 580 that is coupled to CPU 570. Transceiver 580 is coupled to a transformer 585 which is coupled to a switch 590. Switch 590 is coupled to the control bus. Switch 590 implements a 1:1 protection scheme for transceiver 580 and couples CPU 570 to two independent ports on the backplane (not shown). Each of the two ports connects to one copy of the hub of the group matrix. This allows the software on the line card to switch to the backup link when the software detects failures on the active link.

Preferably, CPU 570 includes numerous integrated peripherals including embedded SCC channels (e.g., in-band communications, not shown) and an Ethernet controller (for example, to support communications with other system modules, not shown). In one embodiment, CPU 570 provides an onboard communications processor module (not shown) that handles time-critical aspects of the protocols supported.

Figure 6A:
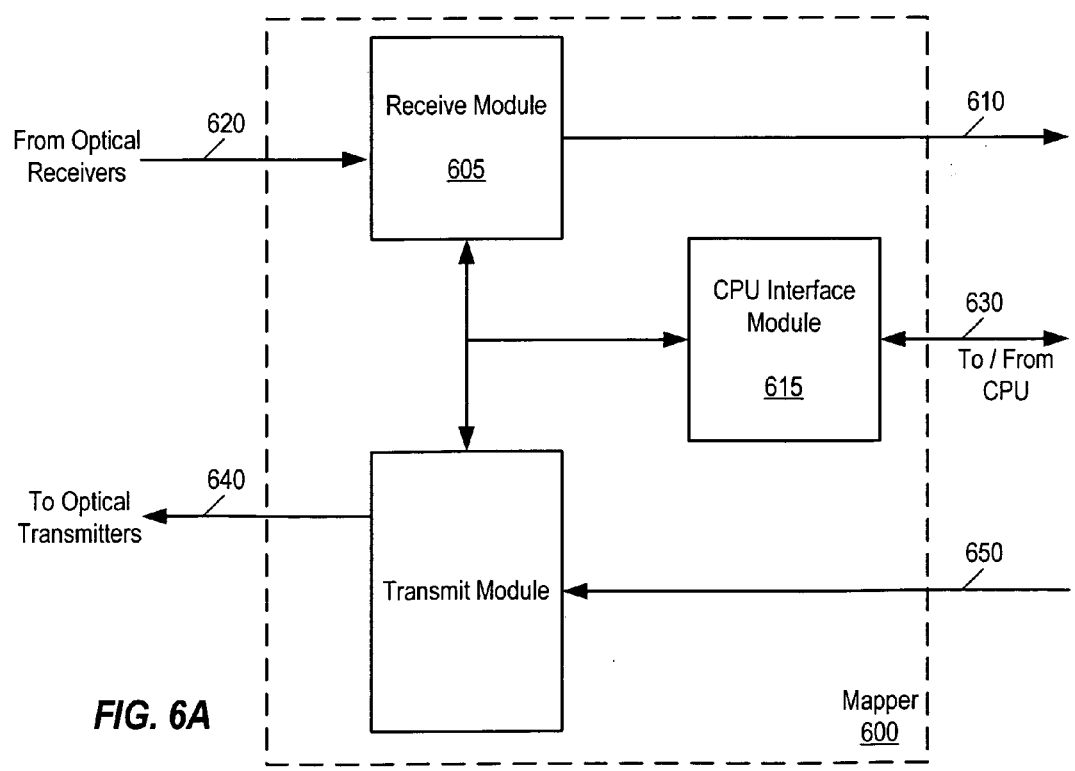
FIGS. 6A–6C illustrate the major components of an exemplary protocol processor.

FIG. 6A illustrates a block diagram of a portion of protocol processor 520 that includes a mapper 600. Mapper 600 includes a receive module 605, a CPU interface module 615, and a transmit module 625. Receive module 605 processes an incoming SONET signal 620 (e.g., an OC-192 data stream) from line-side optical receivers (not shown), optionally processes the forward error correction (FEC) information and de-interleaves the OC-192 signal into four OC-48 line rate signals 610 for delivery to downstream OC-48 processors. Transmit module 625 processes four incoming OC-48 system rate signals from the OC-48 processors (signals 650), optionally inserts forward error correction information, and interleaves the four OC-48 signals into an OC-192 signal 640 for transmission by line-side optical transmitters (not shown). Central processing unit (CPU) Interface module 615 provides a CPU connection via signal 630 to internal device registers. The CPU interface is preferably generic; a suitable CPU that might be supported is Motorola's 860 CPU.

Mapper 600 including receive module 605, transmit module 625 and CPU interface module 615, can be implemented, for example, in one or more ASICs (application specific integrated circuit) using CMOS technology. The ASIC can be a gate array, standard cell, field programmable gate array (FPGA) or other such device integrating a high density of gates and a high degree of functionality into a single integrated circuit. The design of digital logic devices, especially those with complex architecture, is typically performed with the use of a hardware description language (HDL), such as VHDL or Verilog. HDLs are used to describe the architecture and behavior of discrete electronic systems. The system is described using HDL code and simulated to verify proper design and architecture. A synthesis tool converts the HDL code into a gate level implementation, optimizing the logic automatically for circuit size and speed.

Figure 6B:
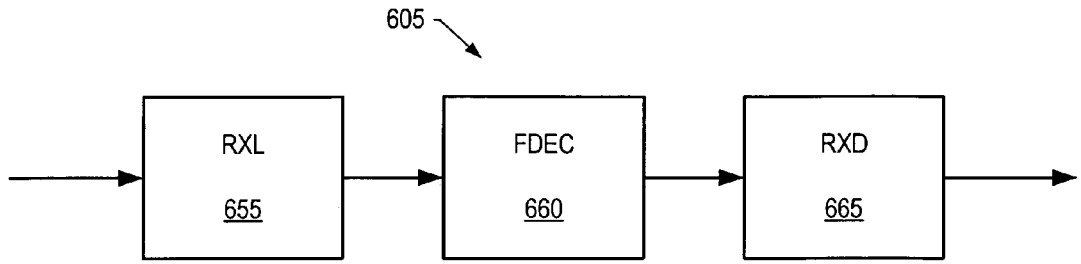

Receive module 605 is illustrated in FIG. 6B, and includes a receive line section (RXL) 655, an FEC decoder (FDEC) 660, and a receive demultiplexer section (RXD) 665. Data flows through receive module 605 from the left in FIG. 6B (the optical signal input), to the right (de-interleaved output interface). A CPU interface from CPU interface module 615 allows for software access to the configuration and status information associated with receive module 605. Besides the primary chip I/O signals connected to receive module 605, there are also several outputs that are routed to transmit module 625 for error reporting and diagnostic loopback functions.

RXL 655 receives the unaligned OC-192 signal via a 16-bit parallel data bus (at 622 MHz), and demultiplexes it down to 16-bytes wide at 77.76 MHz. The demultiplexed signal is framed by RXL 655 and checked for related framing errors and descrambled. The SONET section and line overhead bytes are processed. In addition to providing the section and line SONET processing, RXL 655 generates the clocks and frame position counts needed by the rest of the logic in the receive path. The 16-byte primary output data path from RXL 655 is supplied to the input of FEC decoder 660. FEC decoder 660, shown in further detail in FIG. 8, initially de-interleaves the received OC-192 signal into four OC-48 signals. RXD 665 is responsible for preparing the individual OC-48 signals for delivery to the four downstream OC-48 processors (not shown). The primary operations performed in RXD 665 are inserting the A1/A2 framing bytes, scrambling the signals, generating and inserting B1 check bytes, and, finally, multiplying the data rate from the internal 77.76 MHz clock to the external 155.52 MHz clock used by the OC-48 processors, in one embodiment.

Figure 6C:
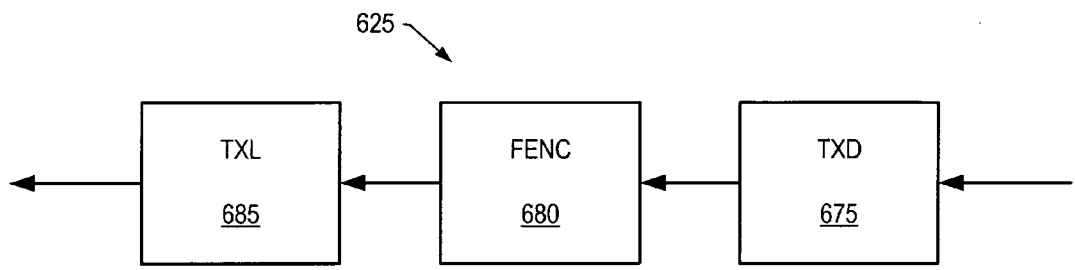

Transmit module 625 is shown in further detail in FIG. 6C, and includes a transmit demultiplexer section (TXD) 675, an FEC encoder (FENC) 680, and a transmit line section (TXL) 685. Data flows through transmit module 625 from the right in FIG. 6C (the demultiplexed input), to the left (SONET line signal). The CPU interface to transmit module 625 allows for software access to the configuration and status information associated with the module. Besides the primary chip I/O signals connected to transmit module 625, there are also several inputs that are routed to receive module 605 for error reporting and diagnostic loopback functions.

In one embodiment, TXD 675 receives four OC-48 signals from four upstream OC-48 processors (not shown), frame aligns the input streams, de-scrambles them, performs a B1 check, and performs a data rate conversion from 155.52 MHz down to 77.76 MHz. FENC 680, shown in further detail in FIG. 7, calculates and inserts check bits on the OC-48 signals received from the four TXD input ports. TXL 685 receives the OC-192 signal from FENC 680, and inserts overhead bits, calculates parity, scrambles the signal, and multiplexes the signal down from the internal 16-byte/77.76 MHz data format. TXL 685 also generates the clocks needed by the rest of the logic in the transmit path.

As explained above, mapper 600 incorporates forward error correction (FEC) circuitry in both the receive and transmit paths. Two alternatives are available for developing FEC codes of a SONET signal, in-band and out-of-band. In an out-of-band implementation, the error code check bytes are calculated for and added to the entire SONET signal, and the new composite signal is transported at some bit rate higher than the native SONET signal. In-band FEC solutions are accomplished by using some of the undefined byte locations in the SONET signal to hide the check bytes needed. Advantages of the latter method are that the native signal rate is retained and interoperability with non-FEC enabled network elements can easily be accomplished.

In the illustrative embodiment of the present invention, an "in-band" FEC solution is implemented using some of the undefined byte locations in the SONET signal to hide the check bytes needed. In this manner, the native signal rate is retained, and interoperability with non-FEC enabled network elements can be accomplished (FEC is disabled). However, the present invention may be implemented with out-of-band solutions as well.

The total delay associated with FEC for mapper 600 is "split" between the FEC encoder 680 and FEC decoder 660, such that one-half of the delay arises from encoding and one-half of the delay arises from decoding, by placing some of the FEC check bits at the front of the row to which they belong (i.e., the encoder stores and holds a row's worth of data while it calculates the check bits to be placed in unused SONET overhead byte locations of the row ahead of the data). The decoder also incurs a row delay since it must have received all of the check bits and the data before it can determine where corrections are needed and actually make the corrections. The available byte locations for check bytes are in the section and line overhead locations of the SONET frame. Check bytes are typically not placed in the unscrambled first row transport overhead locations due concerns of DC balance problems, thus requiring a minimum of a full row of SONET data to be processed before the first available check bit location is accessed. The SONET frame consists of 9 rows of data and a 125 μs (microseconds) frame rate. Therefore, the minimum amount of signal delay that can be achieved is 125/9=~13.9 μs for an in-band FEC. Achieving the minimum delay of one row time is complicated by the fact that the fourth row, which contains the pointer bytes, has no free locations for check byte placement. Because check bytes are not located in every row, the minimum delay that can be achieved for an end-to-end single FEC generate and single FEC decode/correct is two row times or 27.8 μs. This approach is advantageous where intermediate FEC is desired, such as at a regenerator, because the regenerator will only incur one row time (about 13.88 μs) of delay instead of the full two rows of delay that would otherwise occur.

Mapper 600 includes in-band FEC functionality and provides FEC coverage for the Synchronous Payload Envelope (SPE) capacity only. The Section Overhead (SOH) or Line Overhead (LOH) bytes are not covered by the FEC codes. The FEC encoding and decoding is performed on a row by row basis for each OC-48 multiplexed signal. Transmit module 625 contains FEC encode circuitry to encode the SPE of the transmitted data stream and add the BCH codes to the data stream forming a code word. Receive module 605 contains FEC decode circuitry to decode the SPE of the received data stream, utilizing the BCH codes in the received data stream.

As mentioned above, mapper 600 uses a form of FEC that is based on BCH (Bose-Chaudhuri-Hocquenghem) codes, more particularly, a triple-error correcting code generically referred to as BCH-3. The parameters for the FEC circuitry of mapper 600 are (8191, 8152) where m=13 and t=3 (triple error correction per block) and the message block is defined as one row of an OC-48 data stream (87×48). Shortened parameters used in mapper 600 are (4215, 4176), i.e., the block length n (the length of the message bits plus the additional check bits) is 4215 bits, and the message length k (the number of data bits included in a check block) is 4176 bits. The shortened parameters are derived from the parent parameters by assuming that all unused message bytes (8152−4176=3976) are zeroes. In either case (parent or shortened parameters) the number of check bytes added to the message is 39 bytes.

The generator polynomial used by the FEC unit is:

$$G(x)=G_1(x)G_3(x)G_5(x)$$

Where:

$$G_1(x) = x^{13}+x^4+x^3+x+1,$$

$$G_3(x) = x^{13}+x^{10}+x^9+x^7+x^5+x^4+1, \text{ and}$$

$$G_5(x) = x^{13}+x^{11}+x^8+x^7+x^4+x+1.$$

BCH encoding is accomplished using FENC 680. The generator polynomial is applied such that the resulting code word divided by g(x) will have a zero remainder. If the message portion of the code word is denoted u(x), then the remainder b(x) that is left after dividing the code word by the generator polynomial may be expressed as b(x)=u(x)mod[g(x)]. This remainder b(x) represents the actual check bits.

Figure 7:
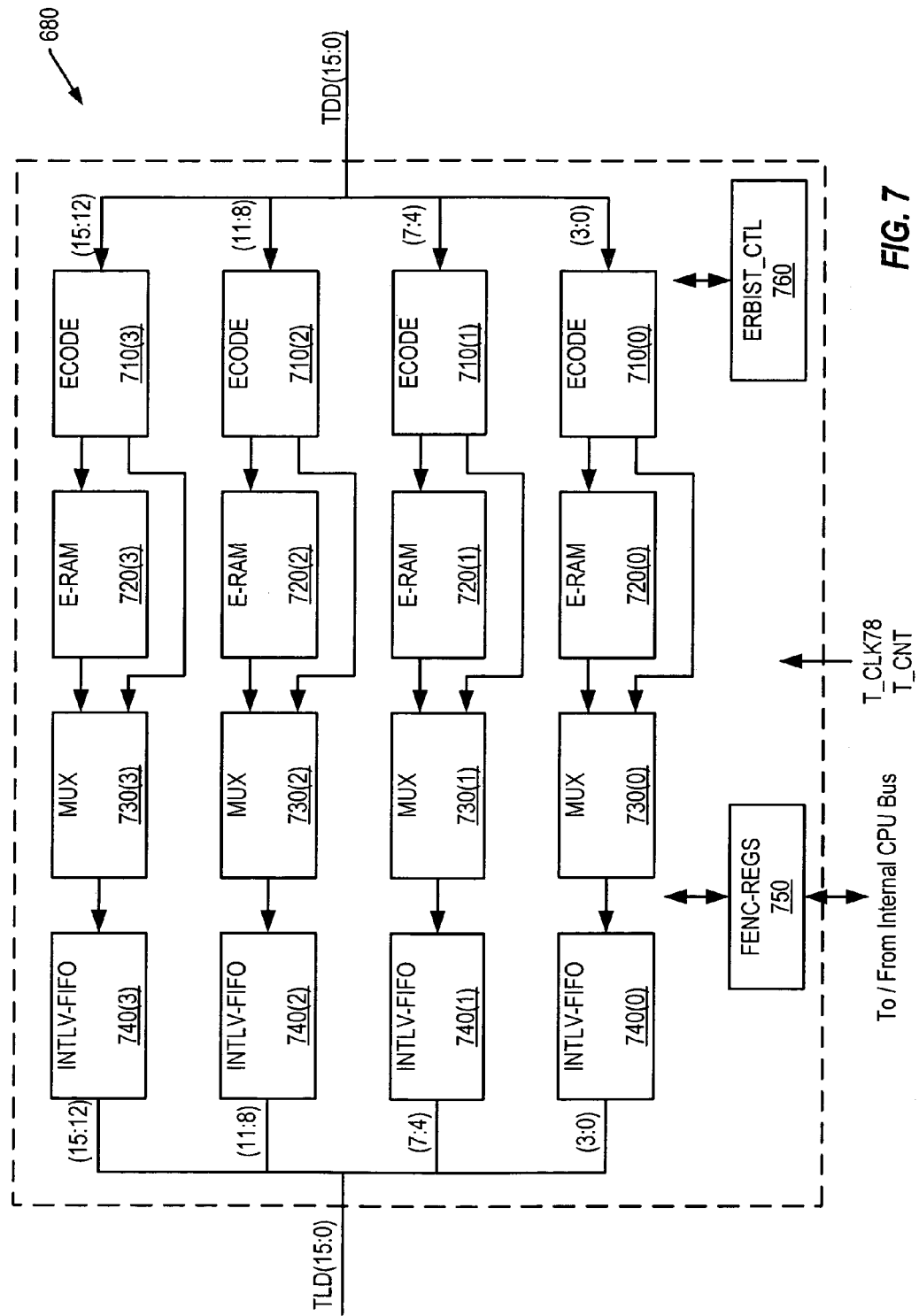
FIG. 7 illustrates a block diagram of a FEC encoder module.

FIG. 7 is a block diagram illustrating one embodiment of FEC encoder 680 in further detail. FEC encoder 680 calculates and inserts check bits on the OC-48 signals received from the four TXD input ports. FEC encoder 680 performs the calculation and insertion of check bytes on OC-48 signals received on TDD(15:0). FEC encoder 680 runs synchronously at 77.76 MHz using the T_CLK78 input as a clock source. The T_CNT frame location field is an input to all of the blocks in FEC encoder 680 and is used to time all of the operations of the module based on the current framing position of the signal being processed.

Four OC-48 signals are received by ECODE blocks 710(3:0) in the byte multiplex order according to SONET. FEC encoding is performed directly on the OC-48 multiplexed signals. ECODE blocks 710(3:0) are check bit generators. Each of ECODE blocks 710(3:0) is preferably identical and, in one embodiment, operates on a single OC-48 signal received from TDD(15:0). ECODE blocks 710(3:0) operate at a 77.76 MHz rate and process eight individual bit streams simultaneously achieved due to bit-wise interleaving of the FEC code across the OC-48 bytes. Each of ECODE block 710(3:0) receives four bytes per clock such that each of the eight bit streams is processed in a four bit parallel manner, i.e., each of the eight bit streams supplies four bits per clock to ECODE blocks 710(3:0). Each of ECODE block 710(3:0) supplies a 39-byte check code output for each row of SONET data received.

RAM storage is typically included to provide one row data buffering for rows which has check bytes preceding data. E-RAM blocks 720(3:0) are identical 1088×32-bit RAMs. E-RAM blocks 720(3:0) are dual ported with a single read port and a single write port. In one embodiment, E-RAM blocks 720(3:0) operate at a 77.76 MHz synchronous clock rate. Each of E-RAM blocks 720(3:0) is responsible for buffering one OC-48 row of data (90 columns×48 bytes=4320 bytes). E-RAM blocks 720(3:0) are used to support the delay scheme chosen for mapper 600 whereby half of the signal delay is incurred in the encoder and half is incurred in the decoder. In the chosen delay scheme, some rows require that their check bytes be placed ahead of the data, thereby necessitating the need for a row buffer in the encoder section.

Each MUX block 730(3:0) is typically identical and is used to combine the data and the check bytes together to create the composite output signal. Additionally, when the FEC encode function is bypassed, MUX blocks 730(3:0) allow the data to be multiplexed around E-RAM blocks 720(3:0) such the signal delay incurred by the FEC encode function is removed. Each of ECODE block 710(3:0) contains a holding register for the calculated check bytes such that they can be held until needed by MUX blocks 730(3:0), and the successive row calculation can proceed.

The final output stage, INTLV-FIFO blocks 740(3:0) performs the interleaving of the four OC-48 signals into a single OC-192 signal. The INTLV-FIFO blocks 740(3:0) are used to assist in the interleaving of the four OC-48 signals output from MUX blocks 730(3:0) into a single OC-192 signal. INTLV-FIFO blocks 740(3:0) are necessary due to the multiplex order that the SONET signal must be transmitted in. INTLV-FIFO blocks 740(3:0) are 32-byte FIFOs (first in-first out) with one read and one write port. The write port (written by MUX blocks 730(3:0)) is accessed four bytes at a time at 77.76 MHz. The read side of the FIFO is accessed 16 bytes at a time at 77.76 MHz. The four FIFOs are each read out 16-bytes at a time in sequence to supply the OC-192 rate signal on the internal TLD(15:0) bus.

FENC-REGS block 750 contain control bits for FEC encoder 680 and are accessed through the internal CPU bus that is common to various blocks in mapper 600. ERBIST-CTL block 760 contains the control circuitry used to perform BIST (Built In Self Test) testing of E-RAM blocks 720(3:0) blocks during production testing.

In alternate embodiments of FEC encoder 680, the width of busses, number of clocks, RAM sizes and FIFO depths can be expanded or reduced as needed to process different sized message blocks and data streams. In addition, clock speeds can be increased or decreased as needed to handle other data stream bit rates.

BCH decoding is accomplished using FDEC 660. The decoding process can be divided into three general steps, namely, the computation of the syndromes, error polynomial generation, and then error correction. The syndrome computations contemplated herein are generally conventional. There are 2t (or, for the present implementation, 6) syndromes that are related to the received code word r(x) by the equation $S_i=r(\alpha^i)$. The received code word r(x) can further be represented as $r(x)=a_i\phi_i(x)+b_i(x)$, where b(x) is the remainder from dividing r(x) by $\phi_i(x)$ ($\phi_i(x)$ is a minimal polynomial). Since, by definition, $\phi_i(\alpha^i)=0$, it can be seen that $S_i=b_i(\alpha^i)$; in other words, the six syndromes may be obtained by dividing the received code word by the minimal polynomials and then evaluating the remainder at $x=\alpha^i$.

In a typical application of error correction codes, the input data is divided into fixed-length blocks ("code words"). Each code word consists of n symbols, of which a fixed number k are data symbols, and the remaining (n–k) symbols are check symbols. (For convenience, in this description, such a code is referred to as an (n, k) code.) As mentioned above, the check symbols represent redundant information about the code word and can be used to provide error correction and detection capabilities. Conceptually, each data or check symbol of such a code word represents a coefficient of a polynomial of order (n–1). In the error correcting and detecting codes of this application, the check symbols are the coefficients of the remainder polynomial generated by dividing the order (n–1) polynomial by an order (n–k) "generator" polynomial over a Galois field. For an order (n–1) polynomial divided by an order (n–k) polynomial, the remainder polynomial is of order (n–k–1). Typically, in a data storage application, both the data symbols and the check symbols are stored.

During decoding, both data symbols and check symbols are read from the storage medium, and one or more "syndromes" are computed from the code word (i.e. the data and the check symbols) retrieved. A syndrome is a characteristic value computed from a remainder polynomial, which is obtained by dividing the code word retrieved by the generator polynomial. Ideally, if no error is encountered during the decoding process, all computed syndromes are zero. A non-zero syndrome indicates that one or more errors exist in the code word. Depending on the nature of the generator polynomial and the type of error to be detected and corrected, the encountered error may or may not be correctable.

Figure 8:
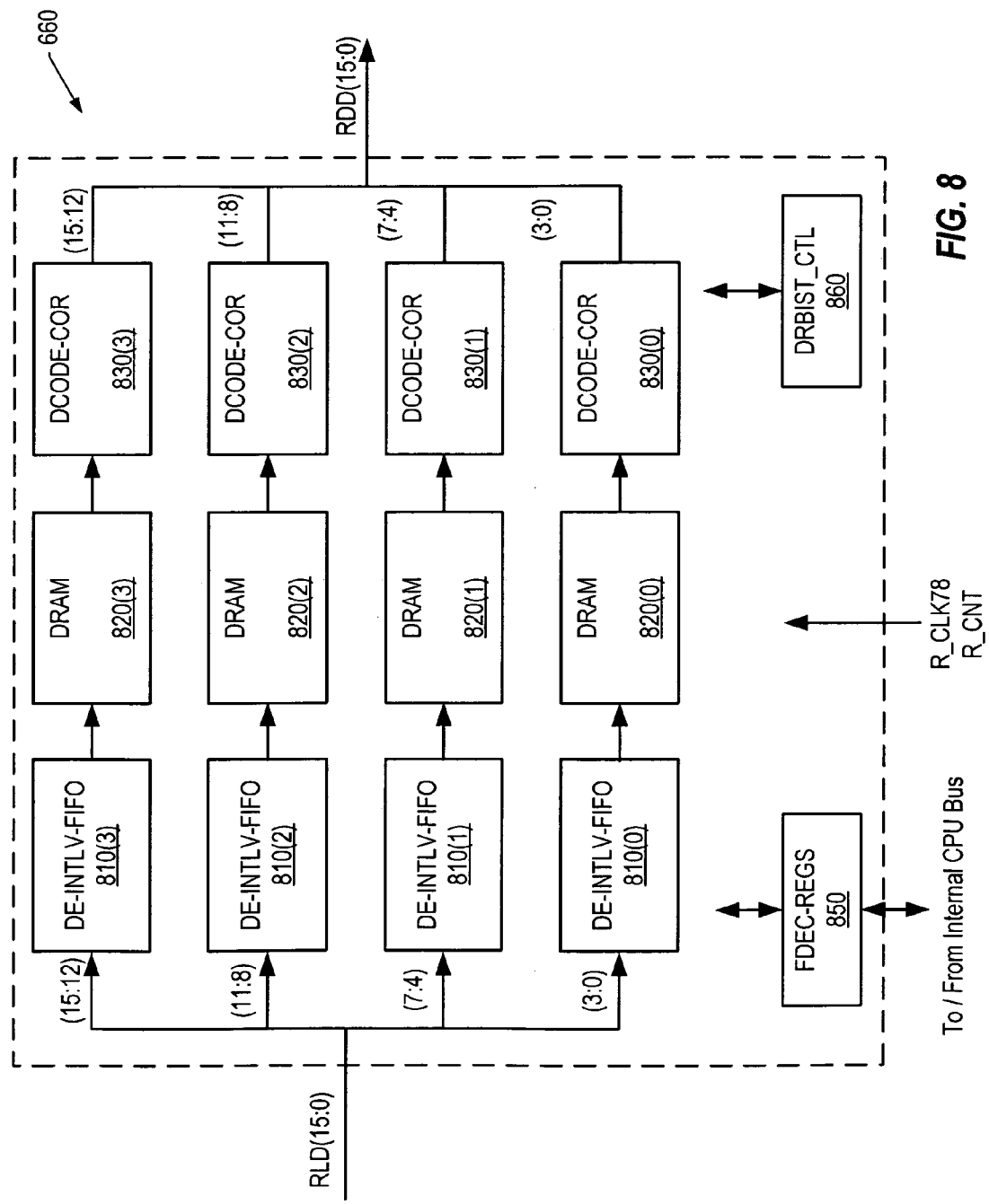
FIG. 8 illustrates a block diagram of a FEC decoder module.

FIG. 8 illustrates a block diagram of FEC decoder 660. FEC decoder 660 initially de-interleaves a received OC-192 signal into four OC-48 signals. FEC decoder 660 operates in parallel on the four OC-48 signals to calculate the FEC syndromes and to perform actual bit error correction on message blocks in the data streams. FEC decoder 660 runs synchronously at 77.76 MHz using the R_CLK78 input as a clock source. The R_CNT frame location field is an input to all of the blocks in FEC decoder 660 and is used to time all of the operations of the module based on the current framing position of the signal being processed.

DE-INTLV_FIFO blocks 810(3:0) are identical FIFOs used to facilitate the de-interleaving of the OC-192 received signal into four OC-48 signals. DE-INTLV-FIFO blocks 810(3:0) receive a 16-byte data stream directly from RLD (15:0). DE-INTLV-FIFO blocks 810(3:0) are 32-byte FIFOs with one read port and one write port. The write port is accessed 16-bytes at a time at 77.76 MHz. The four individual DE-INTLV-FIFO blocks 810(3:0) are written 16-bytes at a time in sequence such that each FIFO receives a 16-byte write operation once every four clocks. The read port of the FIFOs is accessed four bytes at a time at 77.76 MHz. The de-interleaving function is required to separate out the multiplex ordered SONET signal and to allow the four output ports to be operated in frame alignment to each other. Four OC-48 streams are de-interleaved from the received signal, however, the four individual OC-48 signals remain in SONET multiplex order within themselves. The received signal could be an OC-192c signal, in which case the signal must be decomposed into four de-interleaved sub-signals for correct processing by the downstream OC-48 processors.

FEC decoder 660 includes RAM storage to buffer one row of data that is held until all of the correction locations can be found. DRAM blocks 820(3:0) are identical 1088×32-bit RAMs. The RAMs are dual ported with a single read port and a single write port. The RAMs operate at a 77.76 MHz synchronous clock rate. Each DRAM block 820(3:0) is responsible for buffering one OC-48 row of data (90 columns×48 bytes=4320 bytes). The RAMs are used to support the delay scheme chosen for mapper 600 whereby half of the signal delay is incurred in the encoder and half is incurred in the decoder. In the chosen delay scheme, some rows require that their check bytes be placed after their data, thereby necessitating the need for a row buffer to hold the data until the correction locations can be calculated and applied. The RAM modules are sufficient in size to buffer all 90 columns of row data.

DCODE-COR blocks 830(3:0) are identical decode and correction circuits, each of which operates on an OC-48 input signal. The DCODE-COR modules are the most complex portion of the FEC circuitry in mapper 600. Internally, DCODE-COR blocks 830(3:0) contain eight separate FEC decode and correction engines, each one operating on one stream of the eight bit interleaved FEC coded data. Due to the configuration of the RAMs and the operating clock rate chosen (77.76 MHz), each FEC decode and correction engine operates on four bits of data in parallel per clock cycle. DCODE-COR circuits 830 carry out the actual work of error detection and correction, using an implementation of a triple-error correcting BCH code referred to as BCH-3. The functions performed by DCODE-COR blocks 830(3:0) include: generate syndromes, create an error polynomial, find the roots of the error polynomial, and perform the data correction. In addition to performing the error detection and correction, DCODE-COR blocks 830(3:0) also include multiplexers that allow the FEC decode functionality to be either bypassed or disabled.

FDEC-REGS block 850 contains a dedicated set of registers used for control, status, interrupt generation and performance monitoring functions. These registers are accessed through an internal CPU bus that is common to all blocks in mapper 600. DRBIST-CTL block 860 contains the control circuitry used to perform BIST testing the RAM blocks in D-RAM blocks 820(3:0) during production testing.

DESCRIPTION OF PREFERRED EMBODIMENT(S)

The calculations for FEC decode and encode functions are primarily performed in ECODE blocks 710(3:0) of FEC encoder 680 which are check bit generators and DCODE-COR modules blocks 830(3:0) of FEC decoder 660 which contain eight separate FEC decode and correction engines. As explained previously, serial circuit implementations of polynomial equations are easy to implement, however performing calculations serially can take multiple clock cycles for operations to complete.

Figure 9:
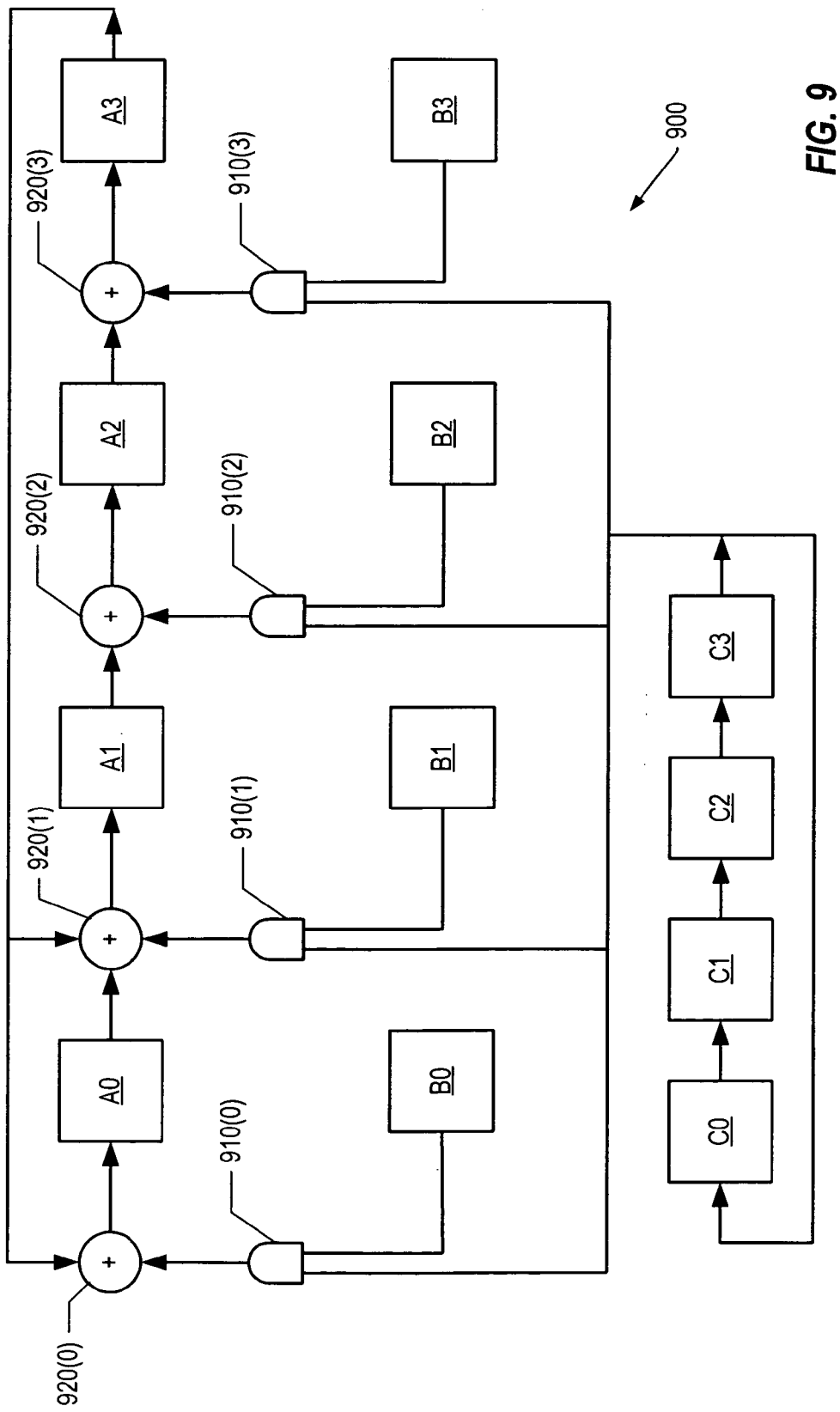
FIG. 9 is an exemplary serial circuit implementing a multiplication operation of two polynomial equations.

FIG. 9 is an exemplary serial circuit implementing a multiplication operation of two polynomial equations. Serial circuit 900 implements the multiplication product $\beta\gamma$ where:

$$\beta=B_0+B_1\alpha+B_2\alpha^2+B_3\alpha^3, \text{ and}$$

$$\gamma=C_0+C_1\alpha+C_2\alpha^2+C_3\alpha^3.$$

The product $\beta\gamma$ can be expressed in the following form and carried out with the following steps:

$$\beta\gamma=(((C_3\beta)\alpha+C_2\beta)\alpha+C_1\beta)\alpha+C_0\beta$$

1. Multiply $C_3\beta$ by $\alpha$ and add the product to $C_2\beta$.
2. Multiply $(C_3\beta)\alpha+C_2\beta$ by $\alpha$ and add the product to $C_1\beta$.
3. Multiply $((C_3\beta)\alpha+C_2\beta)\alpha+C1$ by $\alpha$ and add the product to $C_0\beta$.

Referring to FIG. 9, register C, represented by C0, C1, C2 and C3 is a circular shift register, shifting from least significant bit, C0, to most significant bit C3. The output of C3 is fed into C0 and into four logical AND gates, 910(0)–(3). The outputs of register B, represented by B0, B1, B2 and B3, are fed into the four logical AND gates 910(0)–(3), respectively. The logical AND operation results in a multiplication of the inputs. The outputs of the four logical AND gates 910(0)–(3) are fed into four logical adders 920(0)–(3) respectively. The logical adder operation results in an exclusive OR ("XOR") of the inputs. Register A, represented by A0, A1, A2 and A3, is a feedback register. The output of A0 is fed into logical adder 920(1). The output of A1 is fed into logical adder 920(2). The output of A2 is fed into logical adder 920(3). The output of A3 is fed into logical adder 920(0) and into logical adder 920(1). The outputs of logical adders 920(0)–(3) are fed into resister A0, A1, A2 and A3, respectively.

In the operation of serial circuit 900, register A is a feedback register. Register A is initialized to a value of all zeroes. Register B and register C are loaded with the vector representations of $\beta$ and $\gamma$, respectively. In operation, register A and register C are shifted four times. At the end of the first shift, register A contains ($C_3B$), $C_3B_1$, $C_3B_2$, $C_3B_3$), the vector representation of $C_3\beta$. At the end of the second shift, register A contains the vector representation of $(C_3\beta)\alpha+$ $C_2\beta$. At the end of the third shift, the contents of register A form the vector representation of $((C_3\beta)\alpha+C_2\beta)\alpha+C_1\beta$. At the end of the fourth shift, register A contains the product $\beta\gamma$ in vector form.

According to an embodiment of the present invention, a software program is used to produce parallel equations in a hardware description language for complex polynomial equations by first implementing the equations as a serial circuit, simulating the circuit to produce parallel equations, and then mapping the equations into a hardware description language.

Figure 10:
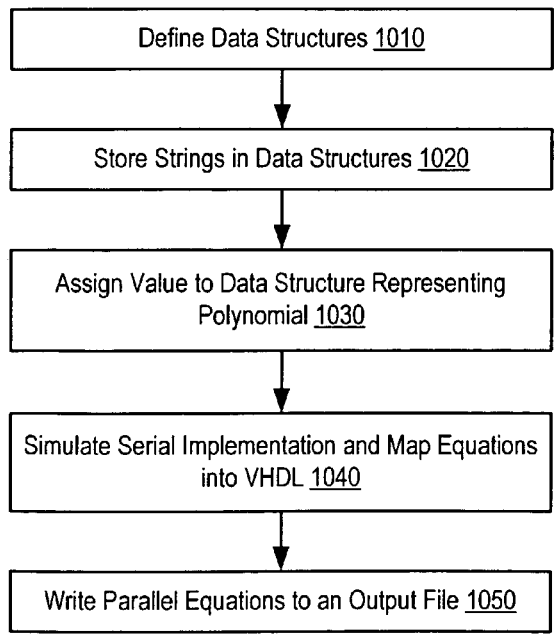
FIG. 10 illustrates a flow diagram for a software program used to produce parallel equations in a hardware description language for complex polynomial equations.
Figure 11:
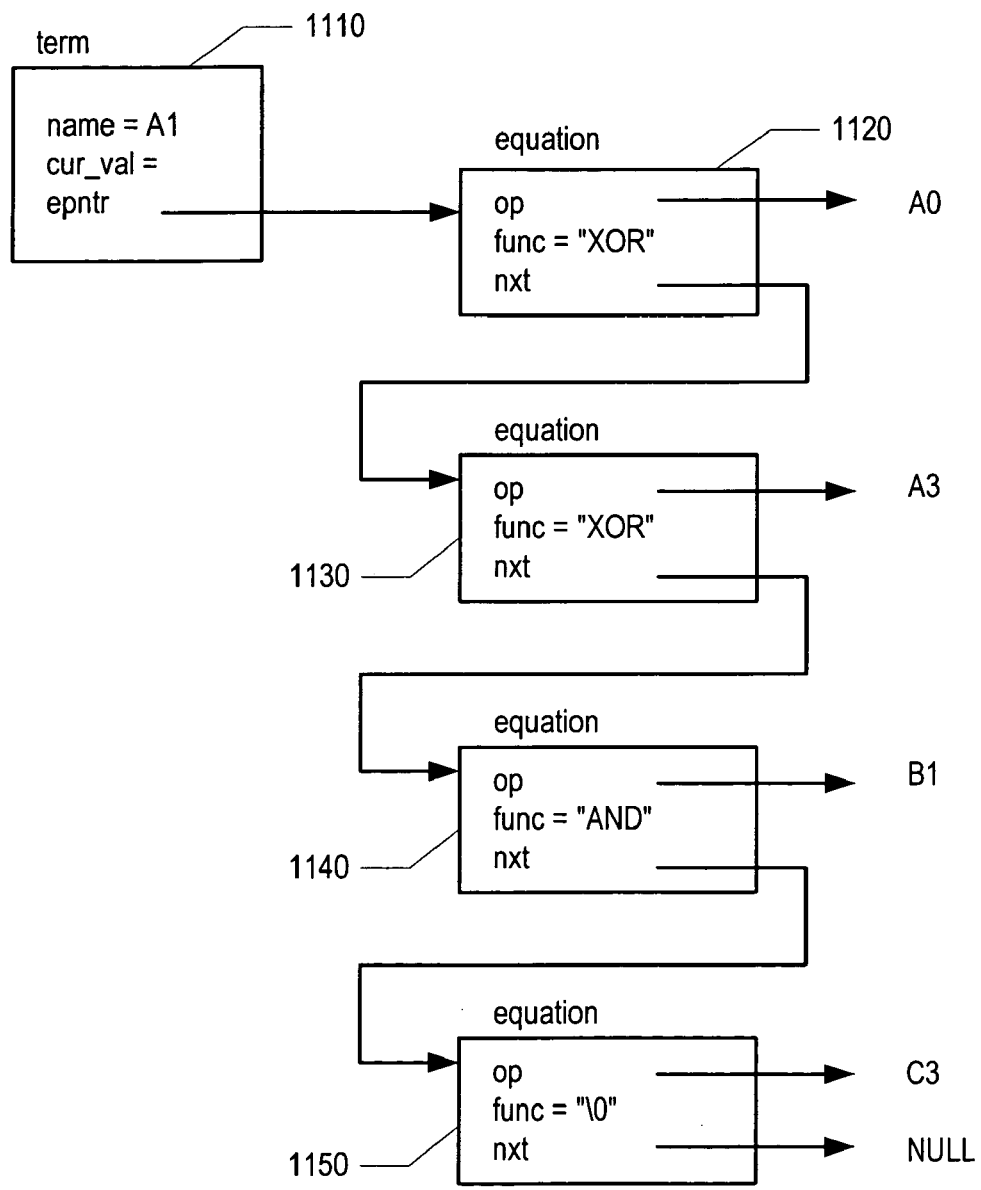
FIG. 11 illustrates a data structure representation of a storage element of the serial circuit of FIG. 9 and an equation link list for the same storage element.

FIG. 10 illustrates a flow diagram for a software program used to produce parallel equations in a hardware description language for complex polynomial equations. As typically required by software programming languages such as C, data structures are defined representing each storage element, for example registers A, B and C of serial circuit 900, and other structures such as a polynomial equation for the serial circuit and a feedback register (needed to isolate the result because register A creates a closed loop), step 1010. An example data structure representing storage element of circuit 900 is shown in FIG. 11. Register A will hold the parallel equations after simulation. ASCII strings are stored in each data structure, for example, ASCII strings "B(0)" through "B(N)" are stored in a data structure representing register B, and ASCII strings "C(0)" through "C(N)" are stored in data structure representing register C, step 1020. A data structure representing the polynomial equation is assigned a value, for example, a value of "201b" in hexadecimal is assigned to the data structure representing the polynomial equation of for GF(13), step 1030.

The serial circuit implementation is simulated, step 1040. The simulation occurs for the number of cycles required to produce one result, for example, four cycles for serial circuit 900. There are many ways of implementing the simulation of the serial circuit in software. In one embodiment, a software routine traverses an equation link list for each storage element to update the current value of the storage element. An example equation link list for a storage element of circuit 900 is shown in FIG. 11. There are four options to updating the current value, based on two conditions. The first condition determines whether this is the first equation in the link list (if so, the current value is empty, otherwise it will already contain a partial equation to which an additional term is appended). The second condition determines whether the equation function is empty. Table 1 illustrates the determinations and the course taken. The parallel equations can be written to an output file, step 1050.

TABLE 1

| First equation? | Equation function empty? | Description |
| --- | --- | --- |
| YES | YES | This is a shift register (storage element to storage element connection). Take the current value of the operand entry stored in the equation |
| YES | NO | This storage element must have an equation associated with it and this is the first function entry for the equation. Get the operand and the function entries for the equation. |
| NO | NO | This must be the last equation in the link list. Append the operand portion of the equation. |
| NO | YES | This is in the middle of an equation so append both the operand and the function. |

A sample C program is included in Appendix A. The program produces 13 parallel equations for the Galois Field multiplication, GF(13), with a generator polynomial of $G_1(x)=x^{13}+x^4+x^3+x+1$.

Appendix B includes the output of the C program of Appendix A. The output is 13 parallel equations in VHDL code.

FIG. 11 illustrates a data structure representation of the storage element for A1 of FIG. 9 and an equation link list for the same storage element. A term block 1110, represents the storage element A1 of circuit 900. Term block 1110 has three parts including a name, a current value (cur_value), and a pointer to an equation structure (epntr). The name is the storage element A1. The current value is undefined before simulation of the circuit and after simulation holds the storage elements current value, for example, the parallel equation which can be fairly long. The pointer epointer points to equation block 1120, the beginning of the equation link list or equation data structure.

Each equation block in the equation link list contains 3 parts including an operand pointer (op) which points to the first operand, a function (func) which is a string representation of the operator, and a pointer (nxt) to another equation structure. Referring to equation block 1120, the operand is A0, the function is "XOR" representing the exclusive or operation, and the nxt pointer points to an equation block 1130. Referring to equation block 1130, the operand is A3, the function is "XOR," and the nxt pointer points to an equation block 1140. Referring to equation block 1140, the operand is B1, the function is "AND" representing the and operation, and the nxt pointer points to an equation block 1150. Referring to equation block 1150, the operand is C3, the function is "\0" representing a null function, and the nxt pointer points to "NULL" indicating the end of the linked list. The data structure representation represents the serial equation:

$A1=A0$ XOR $A3$ XOR $B1$ AND $C3$.

Figure 12:
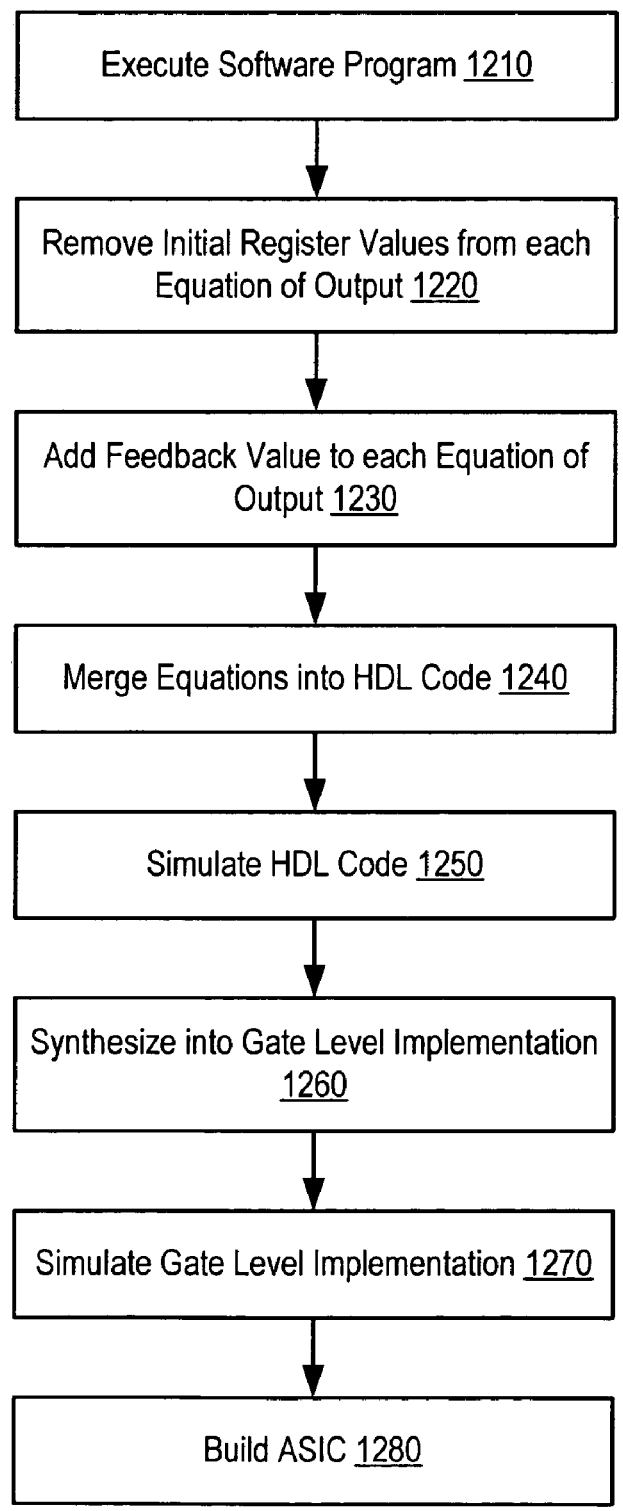
FIG. 12 describes a method for utilizing the output of the software program described in FIG. 10 in an ASIC design implementation.

FIG. 12 describes a method for utilizing the output of the software program described in FIG. 10 in an implementation of a Galois Field Unit used in mapper 600. The software program as described in FIG. 10 is executed to produce the parallel equations in a hardware description language, for example, VHDL or Verilog, step 1210. The initial register terms are removed from each equation because the values of the terms are initialized to zero and cancel out in the equations, step 1220. An external term is added to each equation representing the accumulator portion of the multiply/accumulate operation, step 1230. The equations are merged into the hardware description language describing the rest of the Galois Field Unit, such as FEC encoder 680 or FEC decoder 660, step 1240.

Appendix C includes a sample portion of VHDL code for the Galois Field Unit of mapper 600. The output of the C software program was edited as described in step 1220 and 1230 and merged into the VHDL code.

The hardware description language (HDL) code is then simulated to verify proper design and architecture, step 1250. A synthesis tool converts the hardware description language code into a gate level implementation, optimizing the logic automatically for circuit size and speed, step 1260. The gate level implementation is optionally simulated again to verify proper design and architecture, including timing and functionality, step 1270. Once verified, an ASIC can be built, step 1280. The ASIC can be a gate array, standard cell, field programmable gate array (FPGA) or other such device integrating a high density of gates and a high degree of functionality into a single integrated circuit.

Other embodiments are within the following claims. Also, while particular embodiments of the present invention have been shown and described, it will be obvious to those skilled in the art that changes and modifications may be made without departing from this invention in its broader aspects and, therefore, the appended claims are to encompass within their scope all such changes and modifications as fall within the true spirit and scope of this invention.

What is claimed is:

1. A method for implementing a circuit representing a complex polynomial equation in a hardware description language comprising:
   implementing a serial circuit representing the complex polynomial equation in a software program; wherein implementing the serial circuit includes
   storing a plurality of ASCII strings in each of a plurality of storage elements, wherein the plurality of ASCII strings represent a plurality of initial values of the serial circuit,
   storing one or more ASCII strings in each of one or more data structures wherein the one or more ASCII strings represent one or more mathematical operations in the serial circuit, and
   simulating the serial circuit to produce a plurality of parallel equations, wherein simulating the serial circuit includes
   simulating the serial circuit for a plurality of cycles as required to produce one output represented by the plurality of parallel equations.

2. The method as recited in claim 1, wherein storing the one or more ASCII strings comprises:
   storing an ASCII string "XOR" for each addition operation in the serial circuit; and
   storing an ASCII string "AND" for each multiplication operation in the serial circuit.

3. The method as recited in claim 1, wherein the complex polynomial equation is a Bose-Chaudhuri-Hocquenghem (BCH) code utilized in forward error correction circuitry.

4. The method as recited in claim 1, further comprising:
   writing the plurality of parallel equations to an output file;
   removing initial register values from each of the parallel equations;
   adding a feedback value to each of the parallel equations; and
   merging the parallel equations into a hardware description language (HDL) code file.

5. The method as recited in claim 4, further comprising:
   manufacturing an application specific integrated circuit from the HDL code file.

6. A method for implementing a circuit representing a complex polynomial equation in an ASIC (Application Specific Integrated Circuit) comprising:
   producing one or more parallel equations in a hardware description language, wherein the producing comprises simulating a serial circuit; and
   merging the one or more parallel equations into a hardware description language implementation of a Galois Field circuit.

7. The method as recited in claim 6, wherein producing the one or more parallel equations comprises:
   implementing the serial circuit representing the complex polynomial equation in a software program; and
   simulating the serial circuit to produce the one or more parallel equations.

8. The method as recited in claim 7, wherein simulating the serial circuit comprises:
   executing the serial circuit for a plurality of cycles as required to produce one output represented by the plurality of parallel equations.

9. The method as recited in claim 7, wherein implementing the serial circuit comprises:
   storing a plurality of ASCII strings in each of a plurality of storage elements, wherein the plurality of ASCII strings represent a plurality of initial values of the serial circuit; and
   storing one or more ASCII strings in each of one or more data structures wherein the one or more ASCII strings represent one or more mathematical operations in the serial circuit.

10. The method as recited in claim 9, wherein storing the one or more ASCII strings in each of one or more data structures comprises:
    storing an ASCII string "XOR" for each addition operation the serial circuit; and
    storing an ASCII string "AND" for each multiplication operation in the serial circuit.

11. The method as recited in claim 6, further comprising:
    synthesizing the hardware description language description implementation into a gate level implementation; and
    manufacturing the ASIC from the gate level implementation.

12. The method as recited in claim 11, further comprising:
    simulating the gate level implementation to verify accurate design implementation.

13. The method as recited in claim 6, wherein the complex polynomial equation is a Bose-Chaudhuri-Hocquenghem (BCH) code utilized in forward error correction circuitry.

14. The method as recited in claim 6, wherein merging the one or more parallel equations into a hardware description language implementation of a Galois Field circuit comprises:
    removing initial register values from each of the parallel equations; and
    adding a feedback value to each of the parallel equations.

15. An apparatus for implementing complex polynomial equation mathematics in a hardware description language comprising:
    means for implementing a serial circuit representing the complex polynomial equation in a software program; wherein the means for implementing the serial circuit includes
    means for storing a plurality of ASCII strings in each of a plurality of storage elements, wherein the plurality of ASCII strings represent a plurality of initial values of the serial circuit,
    means for storing one or more ASCII strings in each of one or more data structures wherein the one or more ASCII strings represent one or more mathematical operations in the serial circuit, and
    means for simulating the serial circuit to produce a plurality of parallel equations,
    wherein the means for simulating the serial circuit includes
    means for simulating the serial circuit for a plurality of cycles as required to produce one output represented by the plurality of parallel equations.

16. The apparatus as recited in claim 15, wherein the means for storing one or more ASCII strings in each of the one or more data structures comprises:
    means for storing an ASCII string "XOR" for each addition operation in the serial circuit; and
    means for storing an ASCII string "AND" for each multiplication operation in the serial circuit.

17. The apparatus as recited in claim 15, wherein the complex polynomial equation is a Bose-Chaudhuri-Hocquenghem (BCH) code utilized in forward error correction circuitry.

18. An apparatus for implementing a circuit representing a complex polynomial equation in an ASIC (Application Specific Integrated Circuit) comprising:
    means for producing one or more parallel equations in a hardware description language,
    wherein the means for producing the one or more parallel equations comprises:
        means for implementing a serial circuit representing the complex polynomial equation in a software program, and
        means for simulating the serial circuit to produce the one or more parallel equations;
    means for merging the one or more parallel equations into a hardware description language implementation of a Galois Field circuit;
    means for synthesizing the hardware description language description implementation into a gate level implementation; and
    means for manufacturing the ASIC from the gate level implementation.

19. The apparatus as recited in claim 18, wherein the means for implementing the serial circuit comprises:
    means for storing a plurality of ASCII strings in each of a plurality of storage elements, wherein the plurality of ASCII strings represent a plurality of initial values of the serial circuit; and
    means for storing one or more ASCII strings in each of one or more data structures wherein the one or more ASCII strings represent one or more mathematical operations in the serial circuit.

20. The apparatus as recited in claim 19, wherein the means for storing the one or more ASCII strings in each of the one or more data structures comprises:
    means for storing an ASCII string "XOR" for each addition operation in the serial circuit; and
    means for storing an ASCII string "AND" for each multiplication operation in the serial circuit.

21. The apparatus as recited in claim 18, wherein the means for simulating the serial circuit to produce parallel equations comprises:
    means for executing the serial circuit for a plurality of cycles as required to produce one output represented by the plurality of parallel equations.

22. The apparatus as recited in claim 18, wherein the complex polynomial equation is a Bose-Chaudhuri-Hocquenghem (BCH) code utilized in forward error correction circuitry.

23. The apparatus as recited in claim 18, wherein the means for merging the one or more parallel equations into a hardware description language implementation of a Galois Field circuit comprises:
    means for removing initial register values from each of the parallel equations; and
    means for adding a feedback value to each of the parallel equations.

24. The apparatus as recited in claim 18, further comprising:
    means for simulating the gate level implementation to verify accurate design implementation.

25. An apparatus for performing Galois field decoding comprising:
    a receive line section module for receiving and aligning a SONET signal;
    a Forward Error Correction (FEC) decoder coupled to the receive line section module, the FEC decoder for decoding FEC check bits in the SONET signal, wherein the FEC decoder comprises a first circuit that implements one or more parallel equations, and
        the one or more parallel equations are generated by simulating a serial circuit; and
    a receive demultiplexer coupled to the FEC decoder, the receive demultiplexer for demultiplexing the SONET signal into a plurality of SONET datastreams.

26. The apparatus as recited in claim 25, wherein the FEC decoder comprises:
    a circuit representing a complex polynomial equation made by the method of:
        producing one or more parallel equations in a hardware description language; and
        merging the one or more parallel equations into a hardware description language implementation of a Galois Field circuit.

27. The apparatus as recited in claim 26, wherein producing the one or more parallel equations comprises:
    implementing the serial circuit representing the complex polynomial equation in a software program; and
    simulating the serial circuit to produce the one or more parallel equations.

28. The apparatus as recited in claim 27, wherein implementing the serial circuit comprises:
    storing a plurality of ASCII strings in each of a plurality of storage elements, wherein the plurality of ASCII strings represent a plurality of initial values of the serial circuit; and
    storing one or more ASCII strings in each of one or more data structures wherein the one or more ASCII strings represent one or more mathematical operations in the serial circuit.

29. The apparatus as recited in claim 28, wherein storing the one or more ASCII strings in each of one or more data structures comprises:
    storing an ASCII string "XOR" for each addition operation the serial circuit; and
    storing an ASCII string "AND" for each multiplication operation in the serial circuit.

30. The apparatus as recited in claim 26, the method further comprising:
    synthesizing the hardware description language description implementation into a gate level implementation; and
    manufacturing the ASIC from the gate level implementation.

31. The apparatus as recited in claim 27, wherein simulating the serial circuit comprises:
    executing the serial circuit for a plurality of cycles as required to produce one output represented by the plurality of parallel equations.

32. The apparatus as recited in claim 30, the method further comprising:
    simulating the gate level implementation to verify accurate design implementation.

33. The apparatus as recited in claim 26, wherein the complex polynomial equation is a Bose-Chaudhuri-Hocquenghem (BCH) code.

34. The apparatus as recited in claim 26, wherein merging the one or more parallel equations into a hardware description language implementation of a Galois Field circuit comprises:

removing initial register values from each of the parallel equations; and adding a feedback value to each of the parallel equations.

35. An apparatus for performing Galois field encoding comprising:

a transmit demultiplexer section module for receiving and aligning a plurality of SONET datastreams;

a Forward Error Correction (FEC) encoder coupled to the transmit demultiplexer section module, the FEC encoder for calculating and inserting FEC check bits into the plurality of SONET datastreams, wherein
the FEC encoder comprises a first circuit that implements one or more parallel equations, and
the one or more parallel equations are generated by simulating a serial circuit; and a transmit line section module coupled to the FEC encoder, the transmit line section module for multiplexing the SONET data streams into a SONET signal.

36. The apparatus as recited in claim 35, wherein the FEC encoder comprises:

a circuit representing a complex polynomial equation made by the method of:

producing one or more parallel equations in a hardware description language; and merging the one or more parallel equations into a hardware description language implementation of a Galois Field circuit.

37. The apparatus as recited in claim 36, wherein producing the one or more parallel equations comprises:

implementing the serial circuit representing the complex polynomial equation in a software program; and simulating the serial circuit to produce the one or more parallel equations.

38. The apparatus as recited in claim 37, wherein implementing the serial circuit comprises:

storing a plurality of ASCII strings in each of a plurality of storage elements, wherein the plurality of ASCII strings represent a plurality of initial values of the serial circuit; and storing one or more ASCII strings in each of one or more data structures wherein the one or more ASCII strings represent one or more mathematical operations in the serial circuit.

39. The apparatus as recited in claim 38, wherein storing the one or more ASCII strings in each of one or more data structures comprises:

storing an ASCII string "XOR" for each addition operation the serial circuit; and storing an ASCII string "AND" for each multiplication operation in the serial circuit.

40. The apparatus as recited in claim 37, wherein simulating the serial circuit comprises:

executing the serial circuit for a plurality of cycles as required to produce one output represented by the plurality of parallel equations.

41. The apparatus as recited in claim 36, the method further comprising:

synthesizing the hardware description language description implementation into a gate level implementation; and manufacturing the ASIC from the gate level implementation.

42. The apparatus as recited in claim 41, the method further comprising:

simulating the gate level implementation to verify accurate design implementation.

43. The apparatus as recited in claim 36, wherein the complex polynomial equation is a Bose-Chaudhuri-Hocquenghem (BCH) code.

44. The apparatus as recited in claim 36, wherein merging the one or more parallel equations into a hardware description language implementation of a Galois Field circuit comprises:

removing initial register values from each of the parallel equations; and adding a feedback value to each of the parallel equations.

* * * * *